(12) United States Patent
Brunner

(10) Patent No.: US 10,974,329 B2
(45) Date of Patent: Apr. 13, 2021

(54) LATHE TOOL COMPRISING A TAPERED COOLANT CHANNEL AND OFFSET COOLANT OUTLET LINES AND CORRESPONDING PRODUCTION METHOD

(71) Applicant: GUEHRING KG, Albstadt (DE)

(72) Inventor: Michael Brunner, Albstadt (DE)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 15/791,841

(22) Filed: Oct. 24, 2017

(65) Prior Publication Data
US 2018/0133809 A1 May 17, 2018

Related U.S. Application Data

(63) Continuation of application No. PCT/EP2016/058914, filed on Apr. 21, 2016.

(30) Foreign Application Priority Data

Apr. 24, 2015 (DE) ............... 10 2015 106 374.3

(51) Int. Cl.
 *B23B 51/06* (2006.01)
 *B23C 5/28* (2006.01)
 (Continued)

(52) U.S. Cl.
 CPC ............. *B23B 51/06* (2013.01); *B23C 5/28* (2013.01); *B23D 77/006* (2013.01);
 (Continued)

(58) Field of Classification Search
 CPC ............. B23B 51/06; B23B 2250/12; B23B 2250/125; B23C 5/28; B23C 2265/08;
 (Continued)

(56) References Cited

U.S. PATENT DOCUMENTS 2,912,887 A * 11/1959 Andreasson ............ B23B 51/06
 408/57
3,040,605 A  6/1962 Andreasson
 (Continued)

FOREIGN PATENT DOCUMENTS

DE  3601385  7/1987
DE  197 19 892  11/1998
 (Continued)

OTHER PUBLICATIONS

Machine Translation, WO2007124738 (A1), Vratny Z. et al., Nov. 8, 2007. (Year: 2007).*
 (Continued)

*Primary Examiner* — Chwen-Wei Su
(74) *Attorney, Agent, or Firm* — Burr & Brown, PLLC

(57) ABSTRACT

A rotary tool for machining workpieces, said tool comprising a base body having a clamping section and a tool head comprising a cutting region having at least one cutting edge. The tool head comprises at least one coolant channel for supplying a cooling and/or lubricating fluid into the cutting region. At least some sections of the coolant channel have a cross-section that tapers in the direction of the tool head. In this region, at least two coolant outlet lines branch off from contact points of the coolant channel in the direction of the tool head upper surface, and are offset in the axial longitudinal direction of the coolant channel. Also, a production method for a rotary tool, in which the blank of the tool is produced by a sintering method in which the coolant channel of the tool is formed integrally in the sintering method at the same time.

15 Claims, 6 Drawing Sheets

Figure 1:
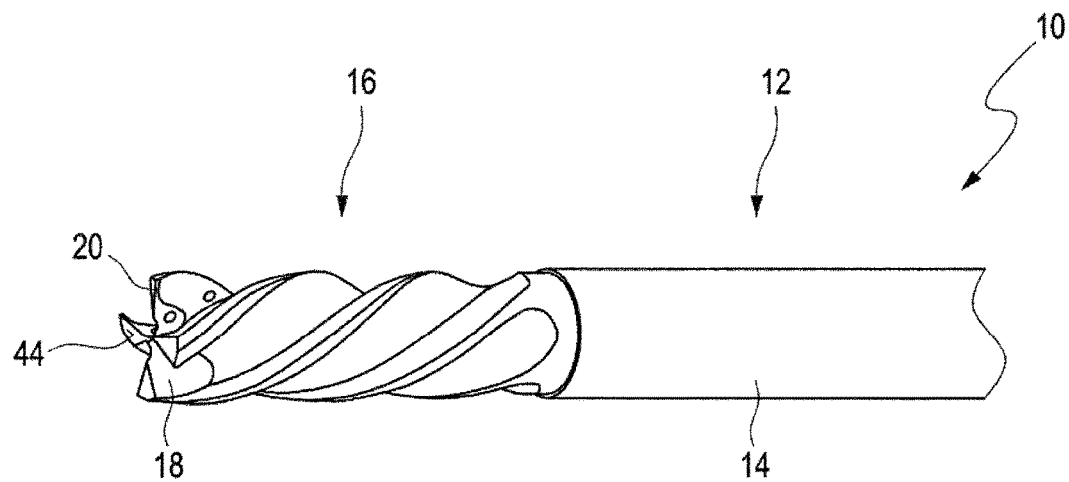

(51) Int. Cl.
  *B23Q 11/10* (2006.01)
  *B23D 77/00* (2006.01)
  *B23Q 11/12* (2006.01)

(52) U.S. Cl.
  CPC ........ *B23Q 11/1023* (2013.01); *B23Q 11/122* (2013.01); *B23B 2250/12* (2013.01)

(58) Field of Classification Search
  CPC . Y10T 408/455; Y10T 408/45; Y10T 407/14; B23D 77/006; B23Q 11/1023; B23Q 11/122
  See application file for complete search history.

(56) References Cited

U.S. PATENT DOCUMENTS

| | | | |
|---|---|---|---|
| 3,293,727 A * | 12/1966 | Simms | B23B 51/00 |
| | | | 279/20 |
| 4,813,823 A | 3/1989 | Bieneck | |
| 4,881,431 A | 11/1989 | Bieneck | |
| 5,599,145 A | 2/1997 | Reinauer | |
| 6,045,301 A * | 4/2000 | Kammermeier | B23B 51/06 |
| | | | 408/230 |
| 6,116,825 A * | 9/2000 | Kammermeier | B23B 51/06 |
| | | | 279/20 |
| 6,575,672 B1 | 6/2003 | Maier | |
| 7,374,374 B2 * | 5/2008 | Berglow | B23C 5/10 |
| | | | 407/11 |
| 8,388,279 B2 | 3/2013 | Kitsukawa | |
| 8,794,879 B2 | 8/2014 | Durst | |
| 9,555,492 B2 * | 1/2017 | Kopton | B23D 77/00 |
| 2005/0084351 A1 | 4/2005 | Friedrichs | |
| 2007/0053755 A1 | 3/2007 | Berglow | |
| 2010/0003097 A1 | 1/2010 | Kitsukawa | |
| 2012/0093592 A1 | 4/2012 | Durst | |
| 2014/0205389 A1 * | 7/2014 | Azegami | B23C 5/10 |
| | | | 407/46 |
| 2016/0263666 A1 * | 9/2016 | Myers | B23B 51/06 |

FOREIGN PATENT DOCUMENTS

| | | |
|---|---|---|
| DE | 20101101 U1 | 7/2001 |
| DE | 103 17 567 | 10/2004 |
| DE | 10 2004 055 377 | 5/2006 |
| DE | 20 2006 007 085 | 8/2006 |
| DE | 20 2005 020 829 | 11/2006 |
| DE | 10 2009 029 715 | 12/2010 |
| DE | 20 2012 103 752 | 1/2013 |
| EP | 0 674 560 | 10/1995 |
| EP | 2 140 960 | 1/2010 |
| FR | 2 927 556 | 8/2009 |
| JP | 2004-167617 | 6/2004 |
| SU | 1140363 A * | 4/1986 |
| WO | 98/55254 | 12/1998 |
| WO | 03/024661 | 3/2003 |
| WO | WO-2007124738 A1 * | 11/2007 ............ B23C 5/10 |
| WO | WO-2013035619 A1 * | 3/2013 ............ B23C 5/006 |
| WO | 2014/186812 | 11/2014 |
| WO | WO-2015166068 A1 * | 11/2015 ............ B23B 31/02 |

OTHER PUBLICATIONS

International Search Report and Written Opinion of the International Search Authority (and English translation) from a corresponding international patent application (PCT/EP2016/058914) dated Jun. 10, 2016, 17 pages.

* cited by examiner (a)

(b)

LATHE TOOL COMPRISING A TAPERED COOLANT CHANNEL AND OFFSET COOLANT OUTLET LINES AND CORRESPONDING PRODUCTION METHOD

The invention relates to a lathe tool for machining workpieces, said tool comprising a base body having a clamping section and a tool head which comprises a cutting region having at least one cutting edge. The tool head comprises at least one tapered coolant channel and at least two offset coolant outlet lines to supply a cooling and/or lubricating fluid into the cutting region.

Furthermore, the invention also relates to a method for producing a lathe tool in this regard.

MOST RECENT BACKGROUND ART

A variety of lathe tools are known from the most recent background art, which have a base body with a clamping section and a tool head. The clamping section can be a clamping shaft or a specially formed axial end area of the lathe tool, which is designed for holding in a special clamping apparatus, such as an HSK clamping apparatus. Such lathe tools can be boring, reaming, milling or polishing tools. Typically, such lathe tools have at least one cutting edge in the tool head, via which material is removed from a workpiece in a machining work process. Particularly in the case of high-performance lathe tools, such as HPC (High Performance Cutting) or HSC (High Speed Cutting) lathe tools, one or a plurality of coolant channels are provided in order to supply a cooling and/or a lubricating fluid into the area of the tool head in order to cool the tool head and the comprised cutting edge and remove the material from the cutting region.

From EP 0 674 560 B 1, OE 197 19 892 A 1, as well as OE 20 2005 020 829 U1, lathe tools are known that have a coolant channel, which is arranged on the longitudinal axis of the lathe tool and can have one or a plurality of coolant outlet lines in the area of the tool head. The coolant channel has a cross-section that is constant across the length and preferably runs centrically within the tool.

DE 20 2012 103 752 U1 discloses a milling tool with at least one coolant channel, wherein the milling diameter is smaller than the clamping diameter. Preferably, the milling tool comprises a plurality of coolant channels running parallel to one another, which run in a longitudinal direction of the clamping section. The outlet openings of the coolant channels lie within the transition area between the milling and clamping section. This design is especially suitable for lathe tools with a small diameters, meaning diameters between 0.05 mm and 4 mm.

DE 10 2009 029 715 A 1, a tool for machining workpieces is known, which is partly made up of a wear-resistant material and partly made up of a tough material. The tool can contain a coolant channel, which has at least one coolant outlet line in the area of the cutting region. The coolant outlet lines can be arranged at various levels on the coolant channel.

DE 201 01 101 U1 discloses a tool for the refined machining of bores, which can have a central coolant channel and coolant outlet lines running radially. If the tool is equipped with a plurality of cutting wheels, coolant outlet lines run in each cutting wheel, which are therefore arranged offset in a longitudinal direction to the workpiece axis.

DE 20 2006 007 085 U1 discloses a lathe tool with a centrally arranged coolant channel. The coolant channel has individually arranged coolant outlet lines that can be inclined towards the clamping section of the lathe tool. The centrally arranged coolant channel has a smaller and constant cross-section in the area of the coolant outlet lines than in the area of the clamping section, wherein the cross-section transition area is designed as a step. The coolant channel is designed with a constant cross-section in the area of the coolant outlet lines.

In WO 03/024661 A1, according to this class, a coolant channel can have a parabolic shape in the area of the clamping section and be designed with a tapered cross-section. The coolant channel has a constant cross-section in the area of the coolant outlet lines.

DE 10 2004 055 377 A1 discloses a lathe tool with a coolant-distributing device attached within the interior space of the lathe tool. The distributing device is a separate component and separates the coolant into partial streams with a defined volume flow. In this way, a certain amount of coolant can be specifically supplied for the lathe-tool cutting process. This can be done by means of bores. The bores are arranged at one level.

In US 2007/0053755 A1, a lathe tool with a coolant channel is evident.

The coolant channel has a reduced cross-section, wherein the largest cross-section is arranged on the clamping end of the lathe tool.

DE 103 17 567 A 1, according to this class, teaches a general method for producing boring tools with coolant channels running in a double-helix manner. Furthermore, OE 36 01 385 A 1, according to this class, discloses a general method for producing sintered bodies.

In the field of machining aluminium and soft-metal materials, which contain a high level of silicon, a high level of lathe-tool wear results due to the toughness of the workpiece being processed. By means of this, in particular, surfaces in the tool head of a lathe tool are subject to mechanical and thermal stress, whereby they thin out and wear down after prolonged use of the lathe tool. Thereby, the danger exists that the mechanical stability of the lathe tool, the lubricity and the service life are limited.

The object of the invention is therefore to suggest a lathe tool and a production method, which makes long-lasting use and a high level of machining quality possible by means of improved cooling, in particular, in the case of aluminium materials containing a high level of silicon and other soft-metal and tough workpieces.

This task is solved by means of a lathe tool and a production method according to the independent claims. Advantageous further developments of the invention of the object of the subclaims.

DISCLOSURE OF THE INVENTION

The object of the invention is a lathe tool for machining workpieces, said tool comprising a base body having a clamping section and a tool head which comprises a cutting region having at least one cutting edge, wherein the tool head comprises at least one coolant channel for supplying a cooling and/or lubricating fluid into the cutting region.

According to the invention, at least in sections, the coolant channel has a cross-section that tapers in the direction of the tool head, and in this region, at least two coolant outlet lines that branch off from contact points of the coolant channel in the direction of the tool head surface are arranged in the region of the tool head, wherein the at least two coolant outlet lines are arranged at positions that are offset in the axial longitudinal direction of the coolant channel.

Due to the coolant outlet lines offset in the longitudinal direction of the coolant channel, the lubricating and/or cooling fluid is continually removed from the coolant channel. Thereby, in the case of a plurality of coolant outlet lines, the static pressure in the coolant channel sinks depending on the amount of the lubricating and cooling fluid removed by the respective coolant outlet line. Due to the drop in pressure, flow velocity and, therefore, the flow volume is also reduced. Thereby, the coolant outlet line that is arranged closest to the cutting region of the tool head, meaning on the tip of the workpiece, receives the least amount of lubricating and/or cooling fluid, wherein, at this area, the temperature is the greatest during machining by means of the lathe tool. In order to prevent this, according to the invention, it is strived to keep the flow volume through the coolant channel constant, at least in the area, in which the coolant outlet lines are attached, although the lubricating and/or cooling fluid is removed via the coolant outlet lines.

Due to a cross-section of the coolant channel tapered in the direction of the cutting region of the tool head in at least the area, in which coolant outlet lines exit, the pressure of the lubricating and/or cooling fluid is continually increased in the area of the tool head and therefore, in this area, the flow volume in the coolant channel is continuously increased. Due to the removal of the lubricating or cooling fluid via the coolant outlet lines, this increase of the flow volume can be re-balanced. The cross-section change of the coolant channel can be precisely adapted to the amount of the lubricating and/or cooling fluid removed via the coolant outlet lines so that the pressure and, therefore, the flow volume within the coolant channel can be maintained constant. In accordance with this, in all coolant outlet lines, the same amount of lubricating and/or cooling fluid is supplied with the same pressure and therefore, the same flow volume.

In another aspect, weight and material can be saved in the case of a lathe tool design according to the invention.

In the case of an embodiment with a cross-section of the coolant channel tapered in the direction of the material head, less material is available in the clamping section in comparison to the tool head. During operation, the lathe tool reaches a higher temperature in the area of the tool head than in the area of the clamping section.

Higher mechanical tension levels and a geometric distortion result from a large temperature gradient within the lathe tool. By decreasing this temperature gradient, tension levels can be reduced and a delay of the lathe tool is minimised. If the material distribution in the lathe tool is inversely proportional to the temperature distribution, as is strived for in the present invention, the temperature gradient within the lathe tool can be minimised.

The coolant channel can, for example, have a circular, semi-circular, elliptic, trapezoidal, triangular, square or rectangular cross-section. Thereby, the cross-section shape and also the length of the cooling channel may change with regard to its basic shape or exhibit cross-section changes.

In an advantageous embodiment, the coolant outlet lines can be arranged in a circumferential direction of the coolant channel in an offset manner. Thereby, the contact points of the coolant outlet lines can be arranged in a row offset in a radial direction or in a longitudinal direction of the coolant channel. Both arrangements can be combined. In the case of an arrangement offset in a radial direction, the contact points of the coolant outlet lines are placed in a zigzag shape around the circumference of the coolant channel. All circumference ranges of the tool head are cooled evenly by means of a radial displacement.

In another advantages embodiment, the contact points of the coolant outlet lines can be arranged with the coolant channel in a spiral shape around the coolant channel. Thereby, the spiral shape can also go around the circumference of the coolant channel several times. The contact points of the coolant outlet lines with the coolant channel can therefore be arranged in a spiral shape in a circumferential direction around the coolant channel and in a row offset in the longitudinal direction of the coolant channel. Thereby, all coolant outlet lines can be led up to the same level on the tool head surface or be led in a step-shape in offset levels from the tool head to the surface. A maximum distance of outlet lines is made possible so that a weakening of the workpiece wall is reduced.

It is preferable that the coolant channel has a larger cross-section in the area of the base body than in the area of the tool head. Due to a cross-section of the coolant channel tapered in the direction of the cutting region of the tool head in at least the area, in which coolant outlet lines exit, the pressure of the lubricating and/or cooling fluid is continually increased in the area of the tool head. Thereby, in the area of the coolant channel, the pressure of the lubricating and/or cooling fluid can be increased and the flow volume can be continually increased so that an improvement of the cooling effect of the tool head is ensured.

In an advantageous embodiment, the coolant channel can be designed to be conical and/or elliptical and/or parabolic, at least in sections. Thereby, the coolant channel can be orientated in the longitudinal direction of the lathe tool and the section sidewall can be designed to be conical and/or elliptical and/or parabolic. Thereby, the cross-section of the coolant channel can taper towards the tool head depending on the position of the elliptical shape applied and also expand again.

In another embodiment, the entire course of the coolant channel can form an elliptical and/or parabolic shape. Thereby, the coolant channel can run from the clamping section over the tool head and back to the clamping section again. The course of the coolant channel can follow an elliptical or a parabolic shape. Two or a plurality of coolant channels can also run from the clamping section into the tool head and back to the clamping section again. The coolant channels resulting overall can intersect at a point within the area of the tool head and can run from this intersection point into a plurality of orientations lying at an angle to each other towards the clamping section.

In an advantageous embodiment, the coolant channel can comprise at least two sections, more preferably three sections, which each have a different inclination angle $\theta_1$, $\theta_2$ or a curvature progression between the section sidewalls of the coolant channel and the rotational axis of the lathe tool. The pressure increase in the cooling or lubricating fluid within the lathe tool can therefore be adapted to special requirements on an individual basis. The inclination angle can have values between 0° (constant cross-section of the coolant channel) and 90° (cross-section change of the coolant channel). In the case of $\theta=90°$, the section of the coolant channel is only made up of the cross-section change from a section with a smaller cross-section to a section with a larger cross-section or vice versa.

In the case of an advantage of this embodiment, the coolant channel can be tapered at least in one section and run with a constant cross-section in one section, wherein preferably, the tapering section is orientated towards the cutting region of the tool head. Preferably, the coolant channel is tapered in the area of the contact points of the coolant outlet lines with the coolant channel. The cross-section can have a cross-section change between the tapering section and the constant section or cross into each other seamlessly.

In a preferred embodiment, the coolant channel can be designed to be tapered across the complete length of the lathe tool. The pressure distribution of the cooling and/or lubricating fluid can therefore be continuously increased from the clamping section across the tool head up until the tool head surface. The smaller section of the conical coolant channel to be configured in such a way is preferably arranged in the area of the tool head.

In a preferred embodiment, the coolant channel can run centrically within the base body. For the lathe tool, in this way, and optimal turning dynamics can be achieved in the material of the clamping section can therefore be cooled and optimal manner. The coolant channel in the base body can also split up into a plurality of individual coolant outlet lines in the area of the tool head. For example, these can follow the torsions of the tool head. Due to the coolant outlet lines, each cutting edge can be optimally cooled. The accumulating chips are also optimally removed by the lubricating and/or cooling fluid emerging at the tool head surface.

In a preferred embodiment, the coolant channel can run centrically within the tool head. Thereby, the lubricating and/or cooling fluid can also be supplied via a plurality of coolant channels in the base body into the coolant channel in the tool head. For the lathe tool, in this way, optimal turning dynamics can be achieved in the material of the tool head can therefore be cooled and optimal manner. The coolant channel in the tool head can also split into a plurality of individual coolant channels in the area of the clamping section, which run, for example, in parallel through the clamping section. In the area of the tool head, the centrically arranged coolant channel can split up into a plurality of coolant outlet lines.

In a preferred embodiment, in the area of the cutting region, the coolant channel in the tool head can comprise at least one, preferably at least two, coolant outlet lines. The coolant outlet lines can be straight, angled, bent or twisted and can follow the torsions of the lathe tool. Preferably, the coolant channel is tapered in the area of the contact points of the coolant outlet lines with the coolant channel. Due to the removal of the lubricating and/or cooling fluid via the coolant outlet lines, the increase of the flow volume can be re-balanced. The cross-section change of the coolant channel can be precisely adapted to the amount of the lubricating and/or cooling fluid removed via the coolant outlet lines so that the pressure and, therefore, the flow volume within the cooling channel can be maintained constant. In accordance with this, in all coolant outlet lines, the same amount of lubricating and/or cooling fluid is supplied with the same pressure and therefore, the same flow volume as in the coolant channel itself.

In an advantageous embodiment, the number of coolant outlet lines can correspond to the number of cutting edges of the tool head. In this way, each cutting edge of the tool head can be specifically cooled individually. The chips at each cutting edge can also be specifically removed by the cooling and/or lubricating fluid.

The object of the invention is furthermore a method to produce a lathe tool according to the invention. The method is characterized in that the production of the blank of the lathe tool takes place by means of a sintering process, where the blank is made by pressing a fine-grained metal powder, the coolant channel of the lathe tool is integrally formed during the sintering process. With this method, any shape and design of the coolant channel can be produced in a problem-free manner. For this purpose, a positive shape of the cooling channel as an inner core of the blank is used. In another embodiment of the method to produce the lathe tool according to the invention, when the blank is produced, the coolant outlet lines of the lathe tool can be integrally formed during the sintering process. An inner positive core of the cooling channel can preferably comprise cooling channel outlet lines composed of several pieces, which can be removed from the blank after the sintering process. The or the cores of the cooling channel outlet pipes can preferably be inserted into the core of the cooling channel. The complete coolant channel system can therefore be produced during the sintering process.

The advantages and features shown associated with the apparatus according to the invention and the inner-cooled lathe tool according to the invention and their respective advantageous embodiments and designs apply to the method according to the invention and its advantageous embodiments accordingly and vice versa.

The individual features can naturally be combined among one another, wherein other advantageous effects can be employed, which go beyond the sum of the individual effects.

DRAWINGS

Further advantages result from the present drawings and drawing descriptions. In the drawings, exemplary embodiments of the invention are shown. The drawing, the description and the claims contain numerous features in combination. The person skilled in the art shall also expediently view the features individually and compile them into further useful combinations.

In the figures:

FIG. 1 an outer view of a lathe tool with a base body and a tool head of an exemplary embodiment of a lathe tool with a coolant channel according to the invention.

Figure 2:
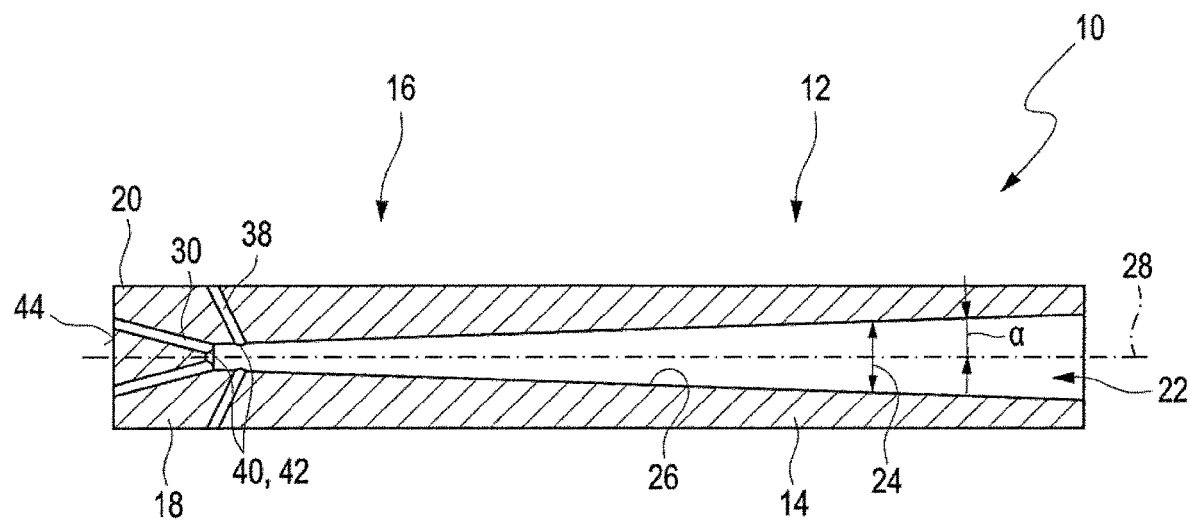

FIG. 2 a schematic representation of a longitudinal section through a design of the lathe tool according to the invention with a conical coolant channel.

Figure 3:
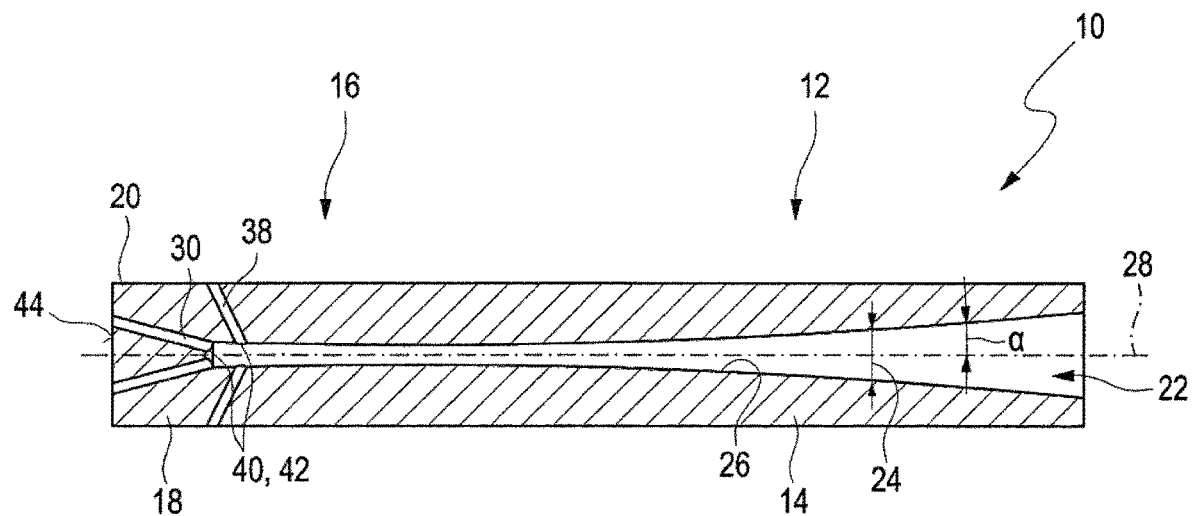

FIG. 3 a schematic representation of a longitudinal section through a design of a lathe tool according to the invention with an elliptical coolant channel.

Figure 4:
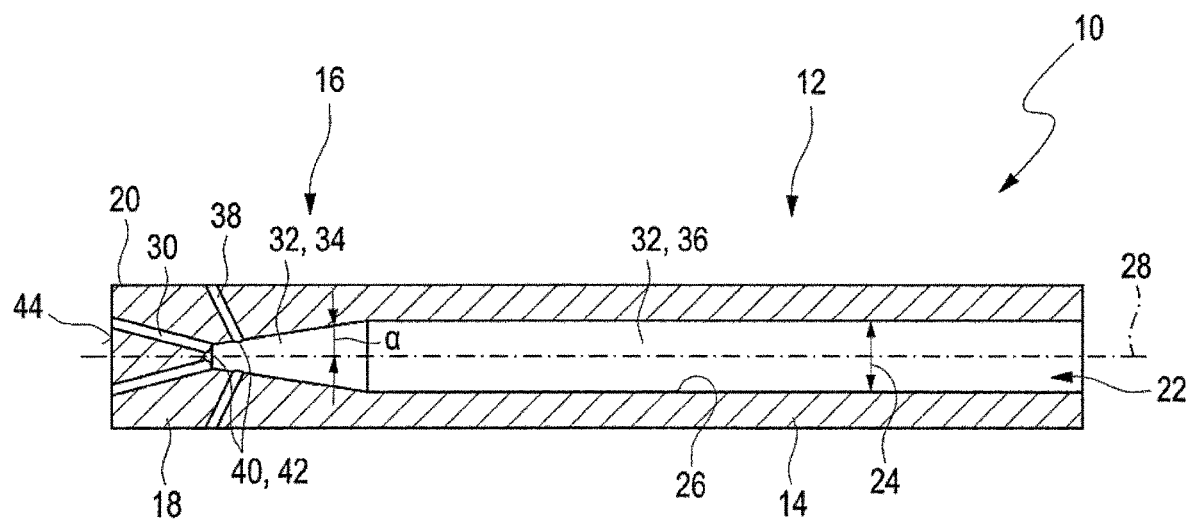

FIG. 4 a schematic representation of a longitudinal section through a design of a lathe tool according to the invention with a coolant channel split into two, comprising one cross-section of the coolant channel that tapers and one that is constant.

Figure 5:
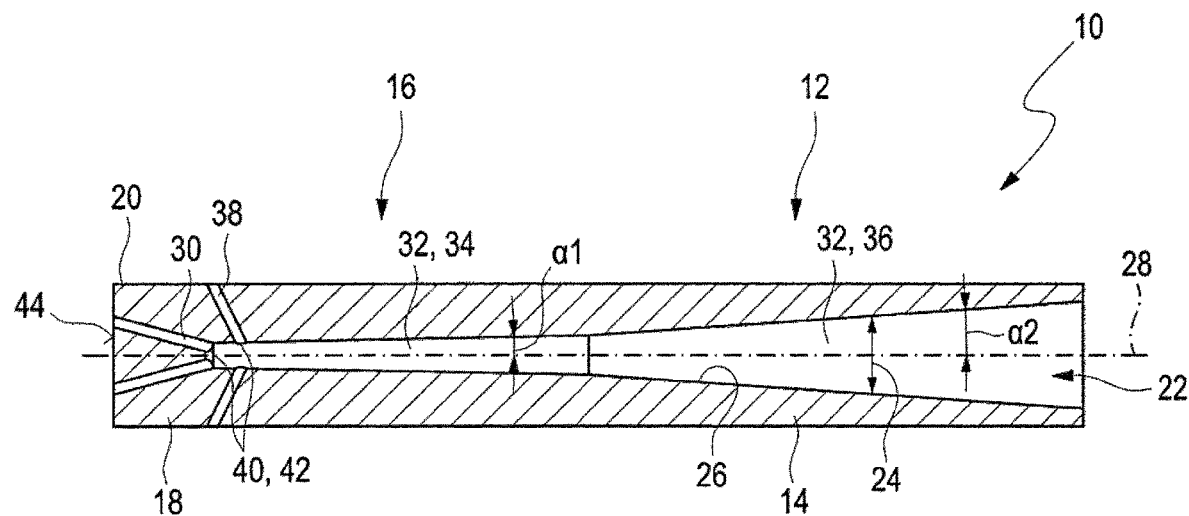
Figure 6:
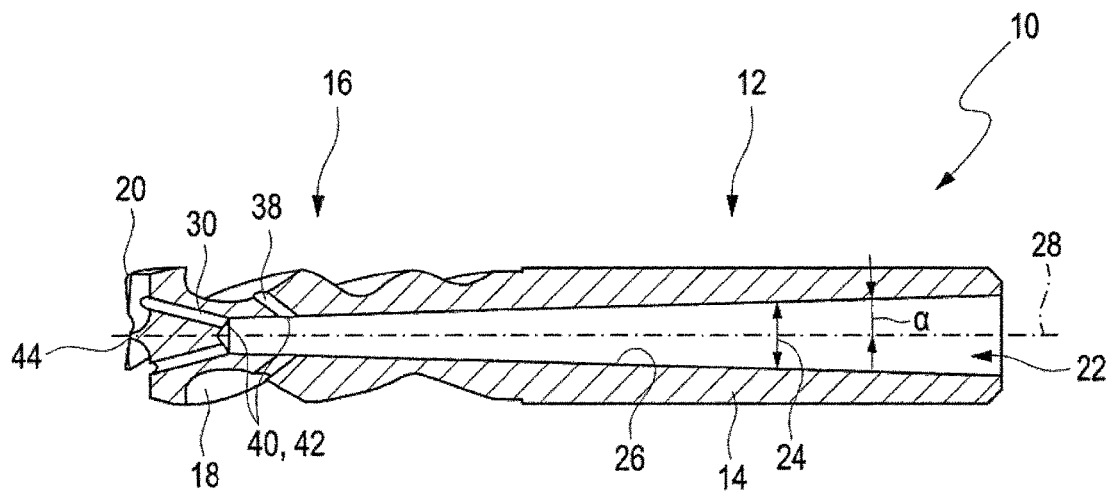
Figure 7:
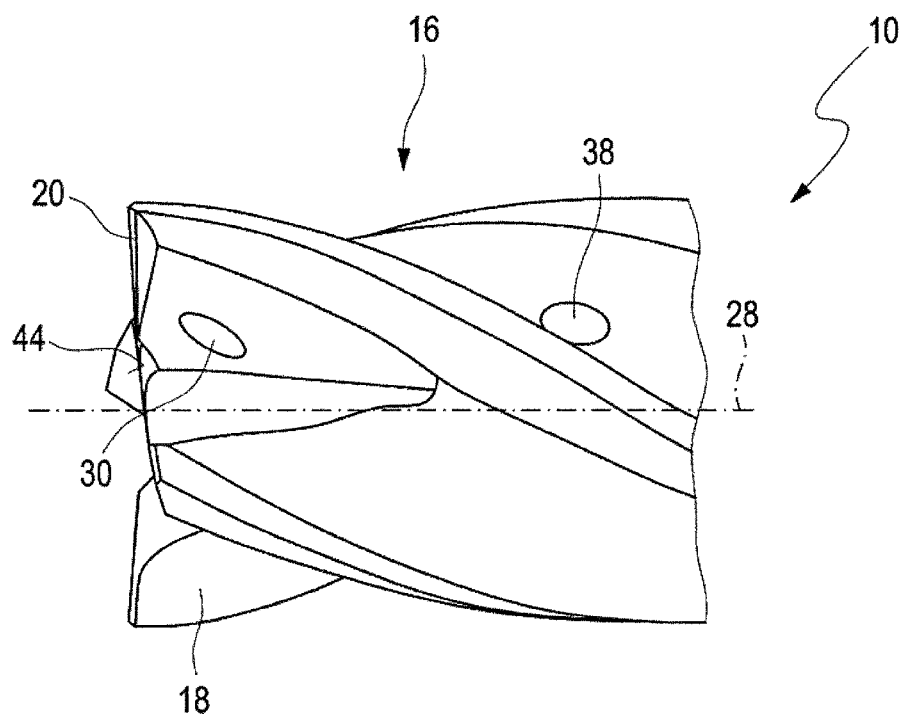
Figure 8:
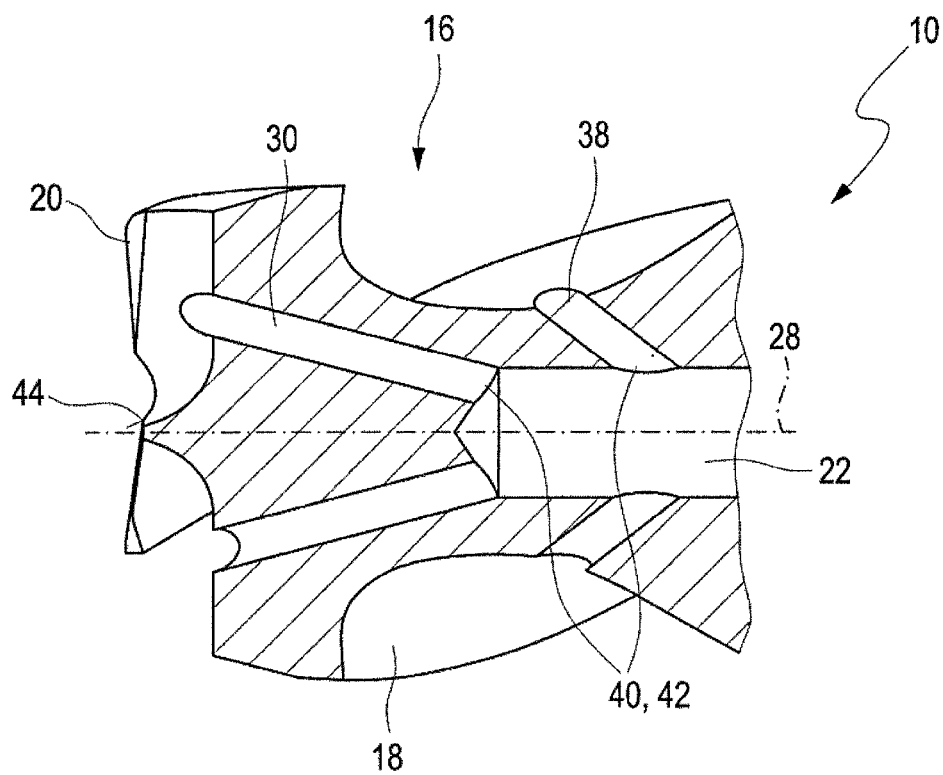
Figure 9:
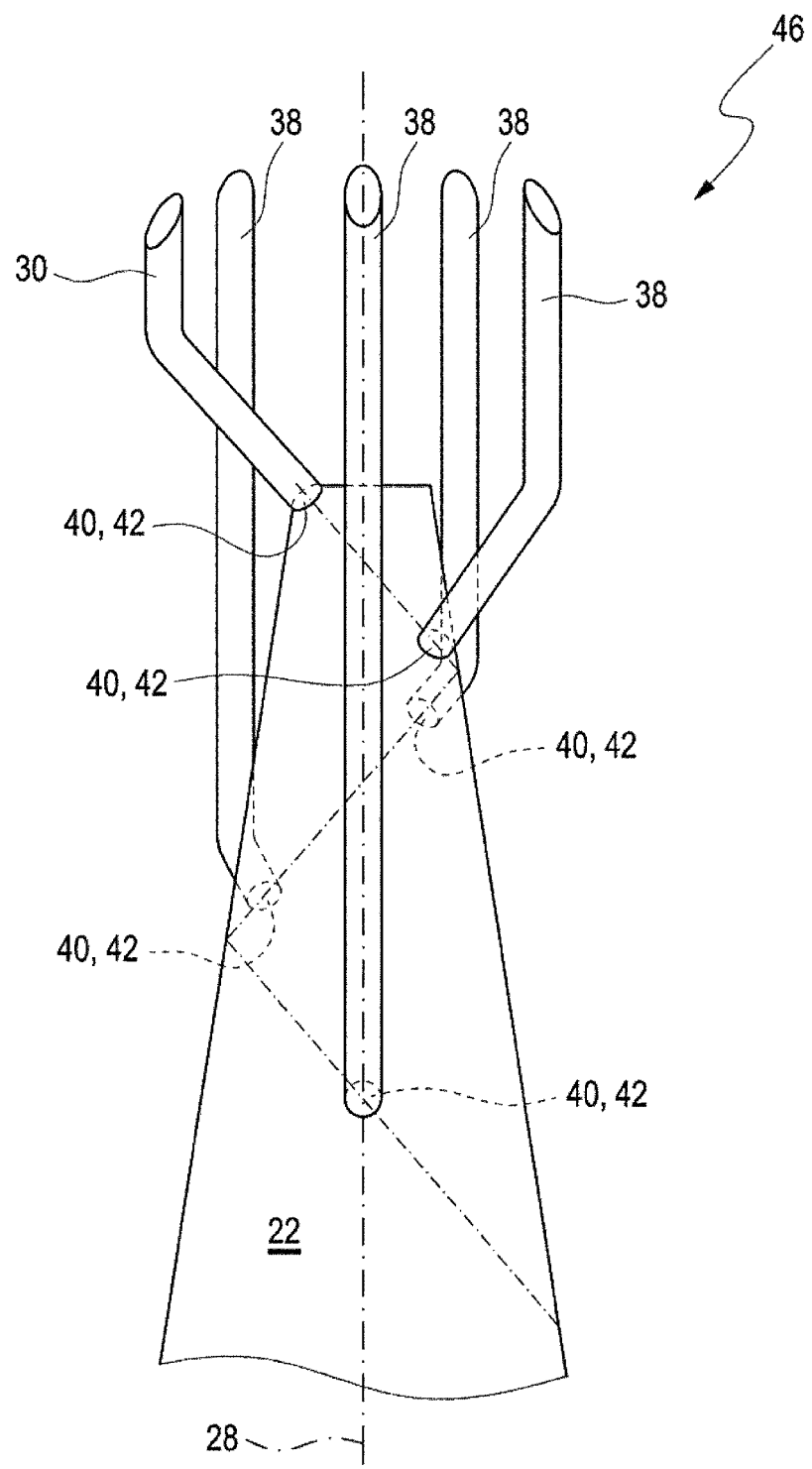

FIG. 5 a schematic representation of a longitudinal section through a design of a lathe tool according to the invention with a conical coolant channel with two coolant channel sections with different inclination angles 01 and 02;

FIG. 6 a representation of a longitudinal section through a design of a lathe tool according to the invention a conical coolant channel;

FIG. 7 a perspective representation of a section of a tool head according to FIG. 6 with coolant outlet lines;

FIG. 8 a representation of a longitudinal section through a tool head according to FIG. 7 with a coolant channel and coolant outlet lines;

FIG. 9 a perspective representation of a coolant channel with coolant outlet lines arranged in a spiral shape, representation without a lathe tool.

Figure 10:
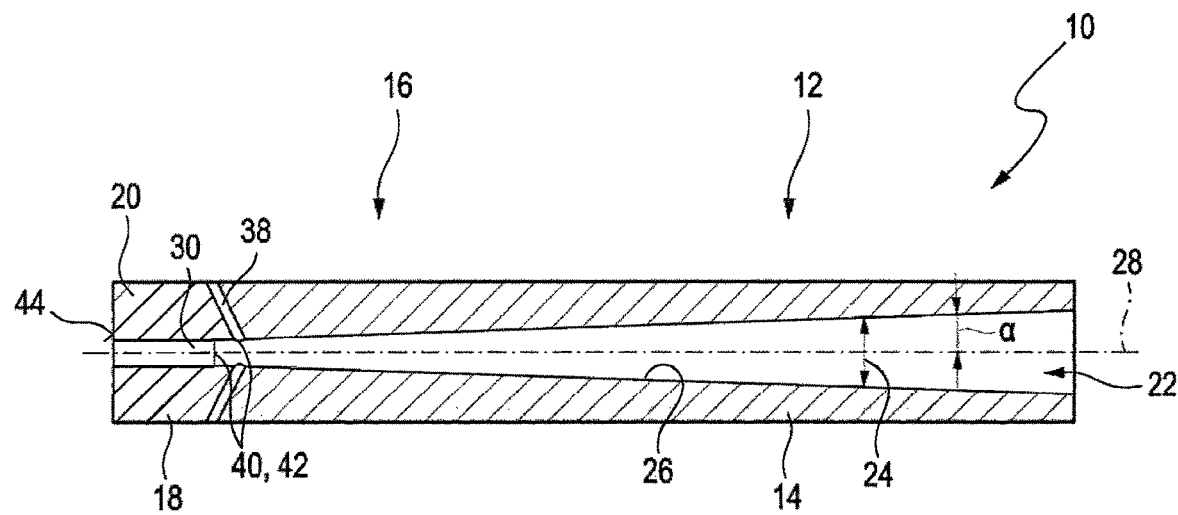
Figure 10:
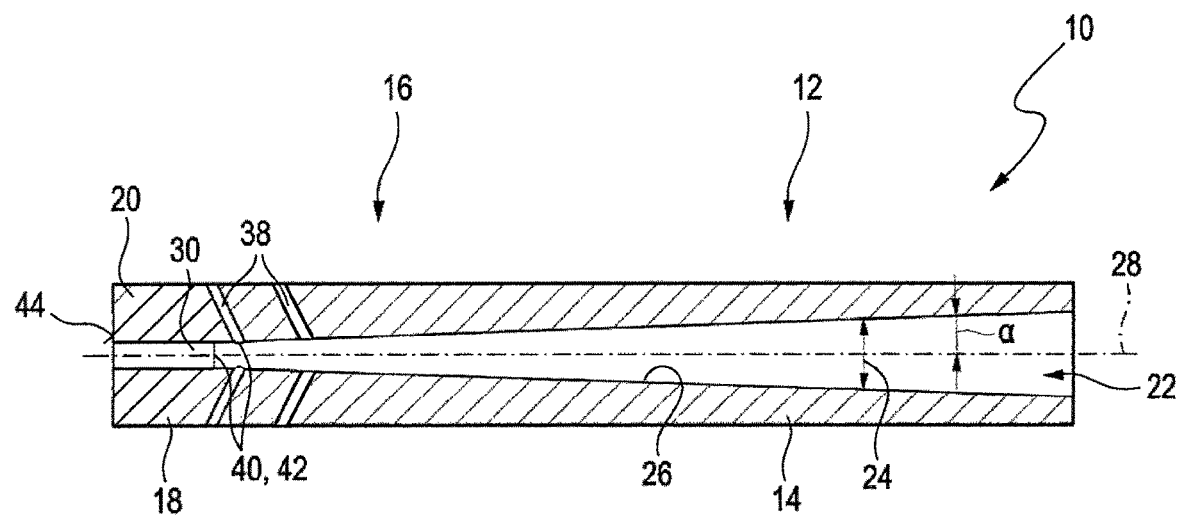

FIG. 10 a representation of a longitudinal section through a tool head with a coolant channel and coolant outlet lines;

In the figures, the same or similar components are numbered with the same reference numbers.

FIG. 1 shows an outer view of a design according to the invention of a lathe tool, made up of a base body 12 with a clamping section 14 and a tool head 16 with a cutting region 18. On the tool head 16 in the cutting region 18, a plurality of cutting edges 20 are arranged on the tool head surface 44. The base body 12 with a clamping section 14 serves to clamp into a clamping chuck (not shown). The lathe tool 10 can, for example, be produced from a chrome-vandium steel (CV steel) or out of a carbide. In order to increase the service life and the functional properties of a lathe tool, the tool head 16 is generally hardened in order to increase mechanical resistance. This is done by means of changing or converting the metal structure of the tool head 16, wherein this is brought about by means of a heat treatment with subsequent quick cooling. Normally, the entire tool head 16 is hardened in the process in order to achieve the desired resistance. The tool head 16 can also be provided with a wear-resistant coating.

FIG. 2 a schematic representation of a longitudinal section through a design of a lathe tool 10 according to the invention a conical coolant channel 22; The coolant channel 22 runs conically and centrically within the lathe tool 10 from the base body 12 with a clamping section 14 over the tool head 16 up into the cutting region 18. In the area of the cutting region 18, a plurality of coolant outlet lines 30, 38 are arranged, which convey the cooling and/or lubricating fluid through the coolant channel 22 up to the cutting edge 20. The coolant outlet lines 30, 38 are connected to the coolant channel 22 via contact points 40, 42. The number of coolant outlet lines 30, 38 can correspond to the number of cutting edges 20 of the lathe tool 10. Thereby, the coolant outlet lines 30, 38 are arranged in various positions 40, 42, which are offset in the longitudinal direction of the coolant channel 22. In the schematic longitudinal section shown, to coolant outlet lines 30 are visible on the end of the coolant channel 22 and two other coolant outlet lines 38, which are offset in longitudinal direction. The coolant channel 22 runs centrically towards the rotational axis 28, wherein the cross-section 24 of the coolant channel 22 decreases in size leading up to the tool head 16. The section sidewall 26 of the coolant channel 22 has a constant angle 0 to the rotational axis 28 across the entire length of the coolant channel 22.

In FIG. 3 a schematic representation of a longitudinal section through an embodiment of a lathe tool according to the invention is also shown. The difference to FIG. 2 is in the design of the section side wall 26 of the coolant channel 22. In this embodiment, the section sidewall 26 of the coolant channel 22 depicts a parabolic or elliptical shape. Thereby, a continuous angle change of the angle 0 exist between the rotational axis 28 of the lathe tool 10 and the section sidewall 26 of the coolant channel 22. Therefore, the cross-section 24 of the coolant channel 22 can be tapered from the clamping section 14 up until the tool head 16 and then expand again.

FIG. 4 shows a schematic representation of a longitudinal section through a lathe tool 10 according to the invention with a coolant channel 22, which is split into two. The coolant channel 22 is arranged centrically to the rotational axis 28 in the lathe tool 10. The coolant channel 22, which is split into two, consists of a constant section 32, 36 and a tapered section 32, 34. The cross-section 24 of the coolant channel 22 is constant in the area of the constant section 32, 36 and reduces in size in the area of the section 32, 34 that tapers towards the tool head surface 44. In accordance with this, the tapered section 32, 34 is located on the tool head 16, at which the coolant outlet lines 30, 38 are attached. The contact points 40, 42 of the coolant outlet lines 30 lie on the coolant channel 22 offset in the longitudinal direction with relation to the contact points 40, 42 of the coolant outlet lines 38.

FIG. 5 a schematic representation of a longitudinal section through a design of a lathe tool 10 according to the invention a conical coolant channel 22, consisting of two coolant channel sections 32, 34, 36 with different inclination angles 01, 02. The coolant channel 22 is located centrical to the rotational axis 28. Both coolant channel sections 32, 34, 36 have different inclination angles 01, 02 between the section sidewall 26 of the coolant channel 22 and the rotational axis 28. Thereby, the coolant channel section 32, 34 with the smaller angle 01 is located closer to the tool head 16, wherein 01 <02. The coolant channel section 32, 36 with 02, wherein 02>01, can extend across the complete length of the clamping section 14 of the base body 12 or also protrude into the tool head 16. An embodiment with a coolant channel section 32, 36 with 02<01 is also possible, wherein, according to this, the coolant channel section 32, 34 with 01<02 lies closer to the tool head 16.

In FIG. 6, a longitudinal section through a design of a lathe tool 10 according to the invention with a conical coolant channel 22 is shown. In this embodiment, the coolant channel 22 is conical across the entire length as is the case in FIG. 2. The coolant channel 22 is arranged centrically within the lathe tool 10 and tapers towards the tool head 16. In the area of the tool head 16, the coolant channel 22 splits into a plurality of coolant outlet lines 30, through which the cooling and or lubricating fluid is transported into the cutting region 16 to the cutting edges 18. In another aspect, the chips are specifically removed by the lubricating and/or cooling fluid. The contact points 40, 42 of the coolant outlet lines 30, 38 with the coolant channel 22 can also be located closer to the clamping section 14 of the lathe tool 10.

FIG. 7 shows a perspective representation of a section of the tool head 16 with coolant outlet lines 30, 38 according to FIG. 6. The coolant outlet lines 30, 38 are attached in the area of the tool head surface 44. Here, individual or several coolant outlet lines 30, 38 are located in the cutting region 18 at each cutting edge 20. The coolant outlet line 30, 38 can follow the windings of the tool head 16 of the lathe tool 10. Via the coolant outlet lines 30, 38, lubricating and/or cooling fluid can be specifically removed and the chips, which accumulate when machining the material using the lathe tool 10 are removed so that no clogging of the bore hole or the like being machined occurs due to the chips FIG. 8 shows a longitudinal section to the view from FIG. 7. The coolant channel 22 leads to the contact points 40, 42 flowing into the coolant outlet lines 30, 38. The coolant outlet lines 30, 38 stretch up until the tool head surface 44 at the cutting edge 20, wherein the offset coolant outlet lines 38 in this embodiment run in the area of the cutting region, however and at the side of the tool head and go onto the surface there. The coolant outlet lines 30 are arranged on the end of the coolant channel 22 of the tool head. In this embodiment, the contact points 40, 42 of the coolant outlet lines 38 are arranged in the circumferential direction of the coolant channel 22 at one level in the longitudinal direction. Other coolant outlet lines 38 that are arranged offset to this are possible at other positions in the longitudinal direction of the coolant channel 22. The coolant channel 22 in this embodiment is designed to be tapered into the direction of the tool head 16 at least in the area of the contact points 40, 42 of the coolant outlet lines 30, 38. The contact points 40,

42 of the coolant outlet lines 30, 38 can also be arranged in a spiral shape around the coolant channel 22, shown in FIG. 9.

FIG. 9 shows a representation of the coolant channel 22 with coolant outlet lines 30, 38, the contact points 40, 42 of which are arranged in a spiral shape around the coolant channel 22. The representation shows the pure cooling channel system 46 without a view of the lathe tool 10 and the tool head 16 and without a representation of the tool head surface 44. The coolant channel 22 is designed to be conical. In the embodiment shown, the coolant outlet lines 30, 38 have a kink and then run parallel to the coolant channel 22, thereby being parallel to the rotational axis 28. The coolant outlet lines 30, 38 and in a level at the tool head surface 44 (not shown). In contrast to the coolant outlet lines 30, 38 from FIG. 7 or FIG. 8, all coolant outlet lines 30, 38 are led up to the cutting region 18 (not shown) accordingly. The coolant channel outlet line 30 is the shortest and is situated on the front end of the coolant channel 22. The other coolant outlet lines 38 are arranged offset in a longitudinal direction to this coolant channel outlet line 38. Due to the spiral shaped arrangement of the contact points 40, 42 of the coolant outlet lines 30, 38 on the coolant channel 22, a coolant outlet line 30, 38 offset in a longitudinal direction of the coolant channel 22, can lie between the two other coolant outlet lines 30, 38 arranged towards the cutting region 18.

The distance and the tool material between the contact points 40, 42 is maximised by this arrangement so that a high level of mechanical stability and service life of the tool can be achieved.

The invention makes the formation of courses of cooling channels possible by means of a sintering process, wherein complex channel courses can be produced by means of pressing instead of boring. By means of this, the production effort and time are considerably reduced. The workpiece blanks can be produced with a central bore within the scope of a dry pressing method. The central bore is primarily conical. A material reduction of solid carbide from 5 to 15% can be achieved, typically at least 9%.

FIGS. 10a and 10b each show a schematic representation of a longitudinal section through a design of a lathe tool 10 according to the invention with a conical coolant channel 22. A tool with such a coolant channel in such coolant outlet lines is a blind hole drill or a blind hole reamer. The coolant channel 22 runs conically and centrically within the lathe tool 10 from the base body 12 with a clamping section 14 over the tool head 16 up into the cutting region 18. In the area of the cutting region 18, a plurality of coolant outlet lines 30, 38 are arranged, which convey the cooling and/or lubricating fluid through the coolant channel 22 up to the cutting edge 20.

The coolant outlet lines 30, 38 are connected to the coolant channel 22 via contact points 40, 42. Thereby, in part, the coolant outlet lines 30, 38 are arranged in various positions 40, 42, which are offset in the longitudinal direction of the coolant channel 22. A coolant outlet line 30 is arranged centrically and runs from the coolant channel 22 directly to the tool head surface 44, wherein this coolant outlet line 30 emerges centrically on the tool head surface 44. The coolant outlet line 30 represents an extension of the coolant channel 22 and can also be seen as a section of the coolant channel 22. In the schematic longitudinal section shown, to other coolant outlet lines 38 can be seen offset in a longitudinal direction. The coolant channel 22 runs centrically towards the rotational axis 28, wherein the cross-section 24 of the coolant channel 22 decreases in size leading up to the tool head 16. The section sidewall 26 of the coolant channel 22 has a constant angle α to the rotational axis 28 across the entire length of the coolant channel 22.

REFERENCE LIST

10 Lathe tool
12 Base body
14 Clamping section
16 Tool head
18 Cutting region
20 Cutting edge
22 Coolant channel
24 Cross-section
26 Cross-section sidewall of the coolant channel
28 Rotational axis
30 Coolant outlet line
32 Coolant channel section
34 Coolant channel section 1
36 Coolant channel section 2
38 Offset coolant outlet line
40 Position of the coolant outlet line on the cooling channel
42 coolant outlet line/cooling channel contact point
44 Tool head surface
46 Cooling channel system

The invention claimed is:

1. A lathe tool for machining workpieces, said tool comprising a base body having a clamping section and a tool head which comprises a cutting region having at least one cutting edge, the tool head comprising at least one coolant channel for supplying a cooling and/or lubricating fluid to the cutting region, the coolant channel having a cross-section tapering across the complete length of the lathe tool in the direction of the tool head, at least two coolant outlet lines branching off from contact points where the respective coolant outlet lines meet the coolant channel, in the area of the tool head, at least two of the coolant outlet lines arranged at positions offset in an axial longitudinal direction of the coolant channel.

2. A lathe tool according to claim 1, wherein the coolant outlet lines are arranged offset in the circumferential direction of the coolant channel.

3. A lathe tool according to claim 1, wherein the contact points where the respective coolant outlet lines meet the coolant channel are arranged in a spiral pattern around the coolant channel.

4. A lathe tool according to claim 1, wherein the coolant channel has a larger cross-section in the area of the base body than in the area of the tool head.

5. A lathe tool according to claim 1, wherein at least one section of the coolant channel is conical, elliptic, or parabolic.

6. A lathe tool according to claim 1, wherein the coolant channel comprises at least two sections which each have a different inclination angle between the section sidewalls of the coolant channel and the rotational axis of the lathe tool.

7. A lathe tool according to claim 1, wherein the coolant channel runs centrically within the base body.

8. A lathe tool according claim 1, wherein the coolant channel runs centrically within the tool head.

9. A lathe tool according to claim 1, wherein the number of coolant outlet lines corresponds to the number of cutting edges of the tool head.

10. A method for the production of a lathe tool according to claim 1, wherein the blank of the lathe tool is produced by a sintering process, and the coolant channel of the lathe tool is integrally formed during the sintering process.

11. A method for producing a lathe tool according to claim 10, wherein the coolant outlet lines of the lathe tool are integrally formed during the sintering process.

12. A lathe tool according to claim 1, wherein the coolant channel comprises at least three sections, which each have a different inclination angle between the section sidewalls of the coolant channel and the rotational axis of the lathe tool.

13. A lathe tool according to claim 1, wherein the tapered section is oriented toward the cutting region of the tool head.

14. A lathe tool for machining workpieces, said tool comprising a base body having a clamping section and a tool head which comprises a cutting region having at least one cutting edge, the tool head comprising at least one coolant channel for supplying a cooling and/or lubricating fluid to the cutting region, the coolant channel having in at least one tapered section, a cross-section tapering in the direction of the tool head and at least four coolant outlet lines branching off from contact points where the respective coolant outlet lines meet the coolant channel, in the area of the tool head, at least four of the coolant outlet lines arranged at positions offset in an axial longitudinal direction of the coolant channel, the contact points where the respective coolant outlet lines meet the coolant channel arranged in a spiral pattern around at least one portion of the at least one tapered section of the coolant channel.

15. A lathe tool as recited in claim 14, wherein a portion of the coolant channel has a constant cross-section.

* * * * *